May 9, 1933.  F. M. WILLIS  1,907,923
METHOD OF OBTAINING DIMENSIONS FOR ARTIFICIAL DENTURE CONSTRUCTION
Filed July 5, 1929

Inventor
Francis M. Willis,
By Clifton C. Callowell
Attorney

Patented May 9, 1933

1,907,923

UNITED STATES PATENT OFFICE

FRANCIS M. WILLIS, OF PHILADELPHIA, PENNSYLVANIA, ASSIGNOR TO THE S. S. WHITE DENTAL MANUFACTURING COMPANY, A CORPORATION OF PENNSYLVANIA

METHOD OF OBTAINING DIMENSIONS FOR ARTIFICIAL DENTURE CONSTRUCTION

Application filed July 5, 1929. Serial No. 376,126.

My invention relates particularly to that class of dental devices that are designed to ascertain the correct bite of a patient in edentulous cases and in partial restorations where the remaining teeth have been worn short by the attrition of mastication.

The principal objects of my invention are to provide a simple and efficient bite measuring device that is especially designed to obtain the necessary dimensions of the patient's face by which may be determined the natural separation of the gum ridges and consequent length of the bite rims of an artificial denture, whereby the natural contour and consequent appearance of the face prior to losing the natural teeth may be restored.

Other objects of my invention are to provide a graduated bite measuring device that may be conveniently adjusted to take exterior measurements of the face of the patient and that may be readily modified to obtain the position of the gum ridges with respect to the characteristic facial measurement of said patient so that the natural distance between the gum ridges may be conveniently computed.

Specifically stated, the form of my invention as hereinafter described comprises a narrow strip of sheet material having one end bent laterally normal thereto and affording an arm for alining or registering with different portions of the patient's face, and provided with a second alining arm mounted to slide longitudinally on said strip and having means for securing said adjustable arm in any desired position with respect to graduations of said strip.

My invention also includes all of the various novel features of construction and arrangement as hereinafter more definitely specified.

Figure 1:
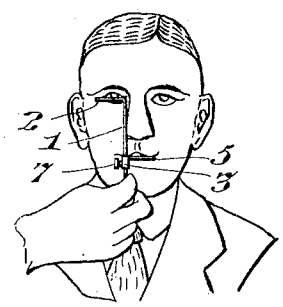
Figure 2:
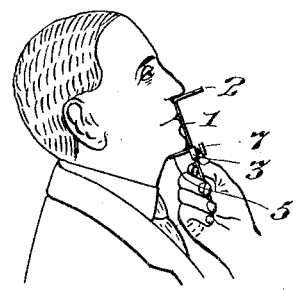
Figure 3:
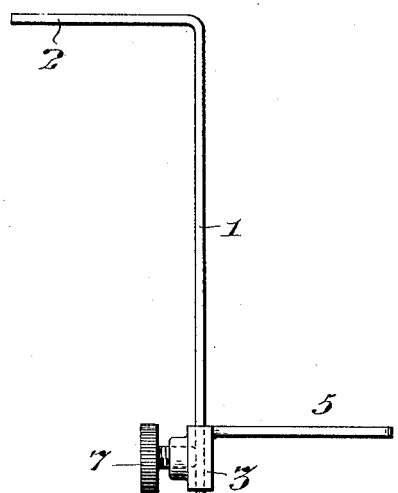
Figure 4:
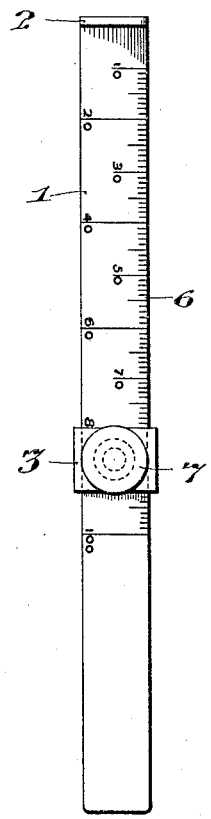
Figure 5:
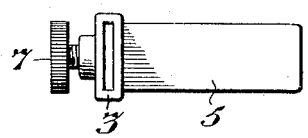

In the accompanying drawing, Figure 1 illustrates on a greatly reduced scale a side elevational view of a bite gauge constructed in accordance with my invention, as applied to the full face of the patient in taking the measurement from the center of the pupil of the patient's eye to the level of the rima oris or parting line of the lips; Fig. 2 is a side elevational view of said bite gauge as applied to the profile of the patient's face and taking the measurement from close under the patient's nose to the bottom of the mandible; Fig. 3 is a side elevational view of the bite gauges shown in Figs. 1 and 2 illustrated in natural size; Fig. 4 is a front elevational view of the bite gauge shown in Fig. 3, as viewed from the left of said figure; and Fig. 5 is an inverted plan view of the adjustable arm per se which is longitudinally slidable on the measuring standard of said bite gauge.

In said figures, the bite gauge comprises a narrow strip of sheet material forming the measuring standard 1 having its upper end portion bent laterally to form an alining arm 2, which is disposed normal to the measuring standard 1, and which is arranged to be alined with the center of the pupil of the eye of the patient in taking certain measurements and with the bottom of the nose of the patient in taking other measurements, and which may be reversed and projected into the mouth of the patient in contact with either the upper or lower gum ridge in taking other measurements.

Slidably mounted on the measuring standard 1 is a slide-block 3 carrying the adjustable arm 5, which is arranged to be adjusted longitudinally on the measuring bar in taking the various measurements of the patient's face and which is arranged to aline with the graduations 6 on said measuring bar to determine the distance between the stationary arm 2 and said adjustable arm 5 as indicated by said graduations, which may preferably be in millimeters. The slide-block 3 is provided with the set-screw 7 by which it may be secured in any adjusted position with respect to the arm 2.

As shown in Figs. 1, 2 and 3, the bite gauge is assembled with the alining arms 2 and 5 projecting from the measuring standard 1 in opposite directions, which is especially convenient in taking the measurements as indicated in Figs. 1 and 2. However, in taking the measurements between the chin and the gum ridge, it is obvious that both the arms 2 and 5 should project from the same side of said measuring standard 1 and, therefore, in taking such measurements the slide-block 3 carrying the arm 5 may be slid downwardly off of said measuring standard 1 and so reversed that the arm 5 extends toward the left of said standard in Fig. 3, as will be obvious.

The first measurement, as indicated in Fig. 1, may be made with the bite rims in situ and the respective alining arms extending oppositely from the measuring standard 1, as indicated in Fig. 3, said measuring standard being held parallel with the length of the face alongside of the nose with the alining arm 2 projecting in alinement with the axis of the pupil of the eye looking straight forward and the adjustable arm 5 adjusted to the level of the rima oris or parting line of the lips, as indicated in Fig. 1.

The second measurement may be obtained by placing the stationary arm 2 close up under the nose of the patient and the adjustable arm shifted into contact with the lower edge of the mandible or under-chin of the patient, as indicated in Fig. 2.

It is a well established fact that to restore the correct contour of the face in denture prosthesis, the bite must be opened until the distance measured from close under the nose to the lower margin of the mandible equals the distance from the pupil of the eye to the rima oris or parting line of the lips.

To obtain the proper length to build the bite rims of the denture, the distance from the axis of the pupil of the eye to the lip line may be first taken, then the distance from the base of the nose to the crest of the upper alveolar ridge, then the distance from the crest of the lower ridge to the bottom of the mandible is then obtained, then by adding together the distance from the base of the nose to the crest of the upper alveolar ridge and the distance from the crest of the lower ridge to the bottom of the mandible and this sum subtracted from the distance between the pupil of the eye to the rima oris or parting line of the lips will give the combined length of the upper and lower bite rims from the lower level of the upper ridge to the crest of the lower ridge or the proper distance between the ridges when the dentures are completed.

By this method there is no guesswork as heretofore employed, but on the contrary, the measurements are taken from surfaces and regions that can be positively determined to obtain the desired restoration of the facial proportions.

It is usually advisable to build the lower bite rim two millimeters higher than the upper bite rim. Thus, if the distance between the gum ridges be found in the above noted calculation to be sixteen millimeters, it would be best to build the lower rim of the denture nine millimeters and the upper rim of the denture seven millimeters from the crest of the ridge to the occlusal surface.

I do not desire to limit my invention to the precise details of construction and arrangement as herein set forth, as it is obvious that various modifications may be made therein without departing from the essential features of my invention as defined in the appended claim.

Having thus described my invention, I claim:

The method of gauging the natural distance between the gum ridges, which consists in measuring the distance between the axis of the pupil of the eye and the lip line as a standard unit, measuring the distance between the base of the nose and the crest of the upper alveolar ridge, measuring the distance between the bottom of the mandible to the crest of the lower gum ridge, adding together the last two measurements and subtracting the sum from the first named measurement, the resultant dimensions determining the normal distance between said gum ridges.

In witness whereof, I have hereunto set my hand this third day of July, A. D. 1929.

FRANCIS M. WILLIS.